Patented Sept. 15, 1925.

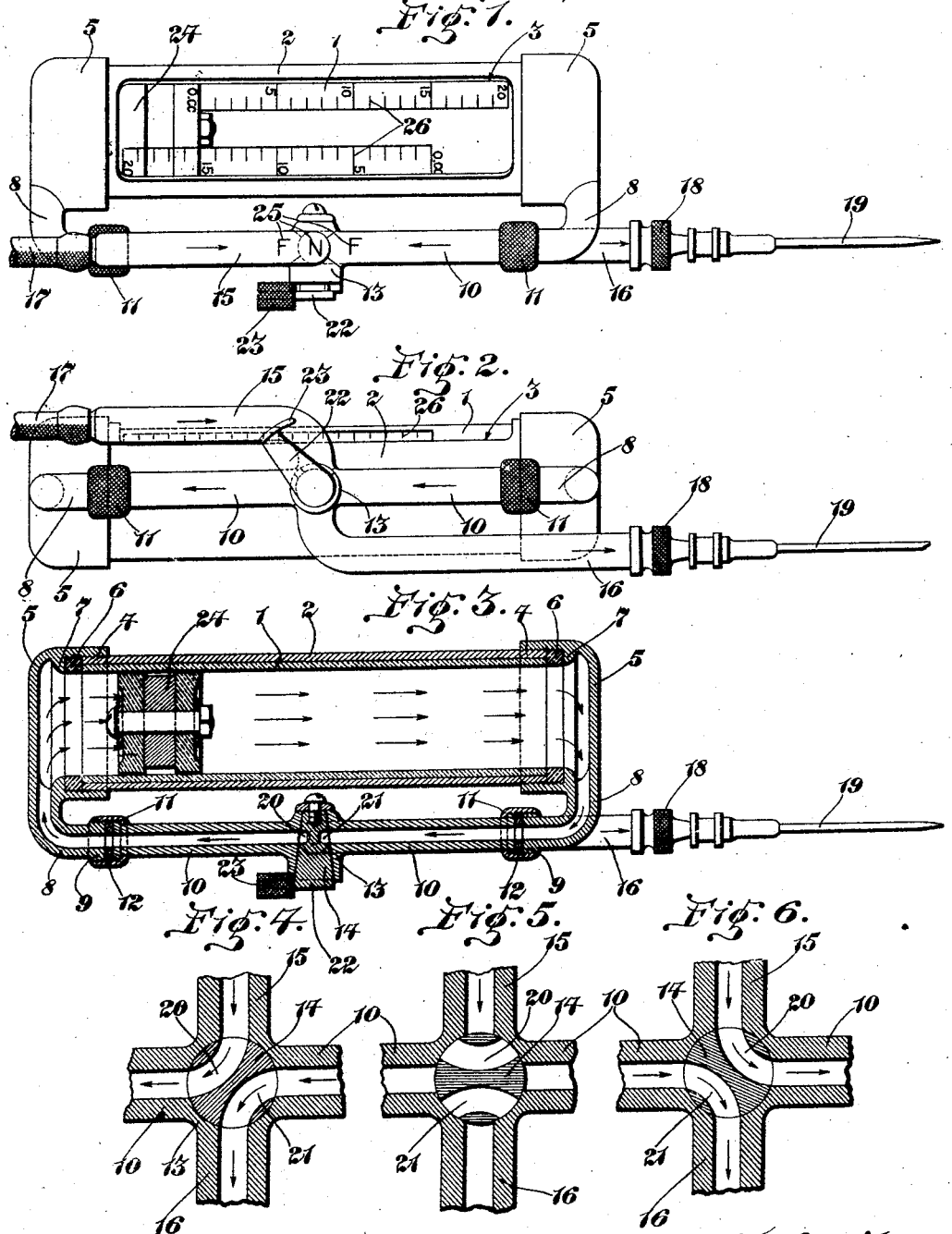

1,553,320

UNITED STATES PATENT OFFICE.

JAMES C. LOGAN, OF CAPE GIRARDEAU, MISSOURI.

SYRINGE.

Application filed April 12, 1920. Serial No. 373,034.

*To all whom it may concern:*

Be it known that I, JAMES C. LOGAN, a citizen of the United States, residing at the city of Cape Girardeau, county of Cape Girardeau, and State of Missouri, have invented new and useful Improvements in Syringes, of which the following is a specification.

This invention relates to improvements in syringes, and more particularly to a self-measuring pressure syringe adapted primarily for inoculation of hogs with anti-hog cholera serum, but applicable also for other purposes.

An object of the invention is to provide a syringe whereby, through supplying a serum to the syringe under pressure, the syringe will operate to inject measured quantities of the serum.

Another object of the invention is to provide a syringe including a cylinder, a reciprocating piston mounted in the cylinder, a liquid supply passage, and an outlet passage with means for controlling the flow of the liquid through the syringe, whereby measured quantities thereof will be delivered to the outlet passage for injection.

Additional features and advantages of the construction will be apparent from the following detailed description taken in connection with the accompanying drawing, in which Fig. 1 is a plan view of the improved syringe.

Fig. 2 is a side elevation.

Fig. 3 is a vertical section.

Figs. 4, 5 and 6 are detailed views of the valve for controlling the flow of liquid shown in the various operative positions.

In the embodiment of the invention shown in the drawing the syringe is illustrated as including a cylinder 1 preferably of glass mounted in a cylindrical metallic housing 2, the housing 2 having an opening 3 exposing one side of the cylinder. The housing 2 has oppositely developed threaded portions 4 at each end adapted to receive in threaded engagement head pieces or caps 5.

In order to effect a tight joint between the ends of the cylinder 1 and the head pieces or caps 5 gaskets 6 are interposed between the ends of the cylinder and flanges 7 formed integral with the caps 5. The head pieces or caps 5 have laterally extending curved pipes 8 that have at their ends threaded portions 9. A tube 10 equipped with coupling nuts 11 at each end is adapted to be connected with the ends of the pipes 8, a tight joint between the pipes 8 and the tube 10 being effected by interposing gaskets 12 between the matching ends thereof.

Substantially intermediate the length of the tube 10 is a valve casing 13 in which is mounted a conical valve body 14. A supply pipe 15 extends into the valve body at a ninety degree angle in respect of the tube 10, and a discharge pipe 16 opening diametrically opposite to the supply pipe leads from the valve casing 13. The pipe 15 is arranged to receive a supply of liquid from a flexible conduit 17, the liquid being supplied to the conduit 17 from a container by air pressure. The discharge passage 16 terminates in a needle support 18 into which a hypodermic needle 19 is connected.

The valve body 14 has duplicate passage ways 20 and 21 therein arranged with the openings thereof at ninety degree angles. The valve body is designed to be moved by an arm 22 provided with a knurled thumb piece 23. The design of the valve body is such that when it is in the position shown in Fig. 4, the supply passage 15 will connect with the left hand branch of the tube 10 to fill the cylinder 1 through the left hand pipe 8. At the same time the right hand pipe 8 will discharge from the right hand branch of the tube 10 into the tube 16.

When the valve body is in the position shown in Fig. 5 all the passages will be closed, stopping the flow to and from the syringe cylinders. When the valve body is in the position shown in Fig. 6 the flow is from the supply passage 15 to the right hand end of the cylinder and the discharge from the left hand end. The flow of the liquid to and from the cylinder 1 is controlled by a reciprocating piston 24 which moves from end to end of the cylinder 1 in a direction according to the adjustment of the valve 14. The valve 14 is rocked through an angle of ninety degrees in order to control its three operative adjustments, the position of the valve being indicated by characters 25 disposed adjacent to the arm 22.

On the exposed portion of the cylinder 1 are two scales 26 developed oppositely from the ends of the cylinder 1. The zero end of the scales 26 are respectively positioned away from the ends of the cylinder 1 a distance equal to the thickness of the piston 24, and the capacity of the cylinder ahead of the piston is the quantity of the liquid as indicated on the scale.

In operating the syringe the cylinder is filled from either end and the position of the valve reversed. The liquid contained in the cylinder ahead of the piston is discharged through the discharge passage and the needle 19. The amount of the liquid injected is determined by the scale on the cylinder. After the piston has reached the end of its movement the position of the valve is reversed and the liquid discharged from the opposite side of the piston, it being understood that the cylinder is filled behind the piston as the liquid is discharged from the cylinder on front thereof.

Since the syringe is designed to be self-filling and measuring it may be operated for injecting serum rapidly, and since the serum passes directly into the syringe from the storage container the chances of infection are greatly reduced. Furthermore, the syringe may be operated without loss of the serum as the exact quantity required for an injection may be determined and no leakage or wastage occurs either in filling the syringe or in the injecting of the serum from the syringe.

I am aware that the invention may be modified in certain particulars without departing from the spirit and scope of the invention. What I claim and desire to secure by Letters Patent, is:—

1. A portable syringe for animal inoculation, comprising a transparent cylinder, a piston in said cylinder, a metallic outer cylinder enclosing said transparent cylinder and having an opening therein through which the transparent cylinder is visible to the operator, a valve case, passages from the valve case to opposite ends of the cylinder, a supply passage adapted to be connected with a source of supply and connected into the valve case, a discharge passage from said valve case adapted to receive a hypodermic needle, and a valve member in said valve case arranged to communicate said first named passages selectively with said supply and discharge passages.

2. A portable syringe for animal inoculation, comprising a transparent cylinder, oppositely developed indicating scales arranged adjacent to and extending longitudinally of said cylinder, a piston in said cylinder, a valve case, passages from the valve case to opposite ends of the cylinder, a supply passage adapted to be connected with a source of supply and connected into the valve case, a discharge passage from said valve case adapted to receive a hypodermic needle, and a valve member in said valve case arranged to communicate said first named passages selectively with said supply and discharge passages.

JAMES C. LOGAN.